C. BERGHOEFER, DEC'D.
E. C. BERGHOEFER, EXECUTOR.
BOX CAR LOADING APPARATUS.
APPLICATION FILED MAY 5, 1913.
1,090,966.
Patented Mar. 24, 1914.
6 SHEETS—SHEET 3.
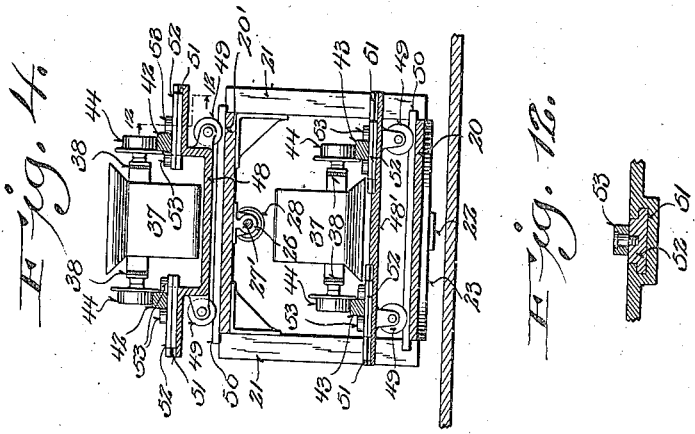
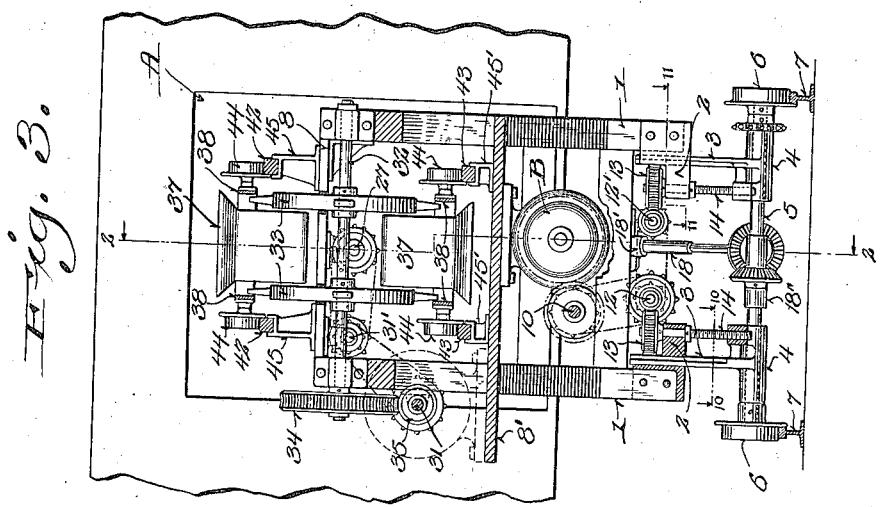

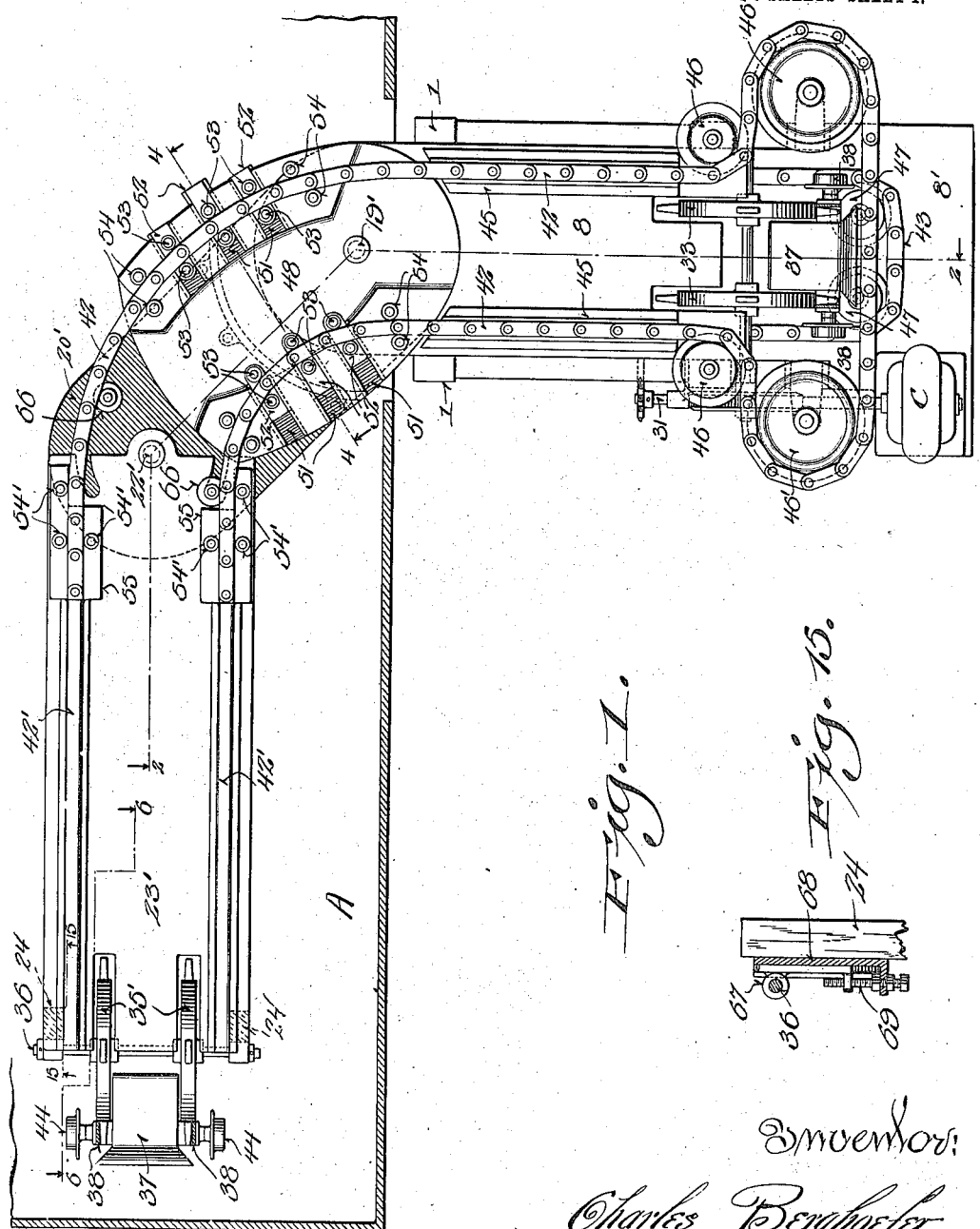

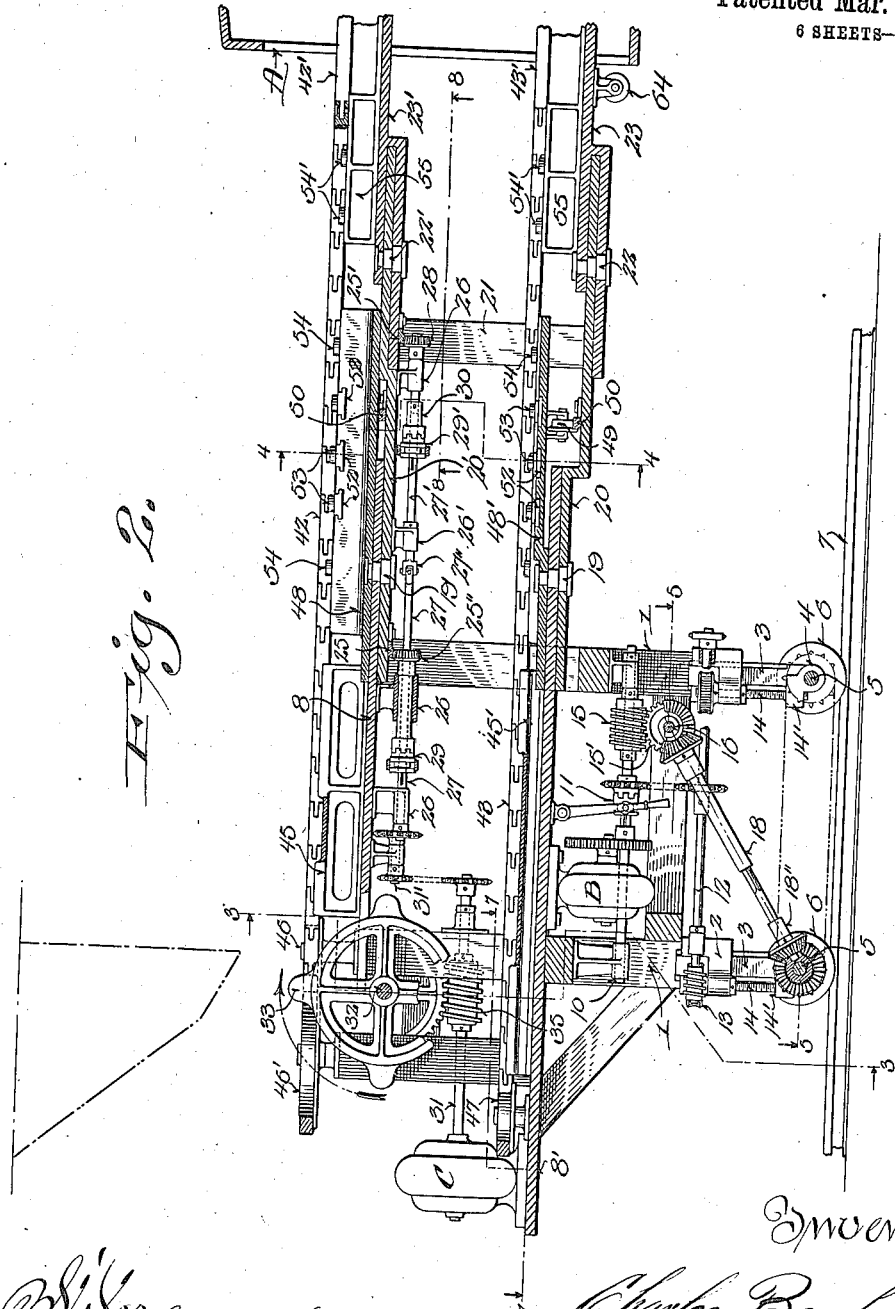

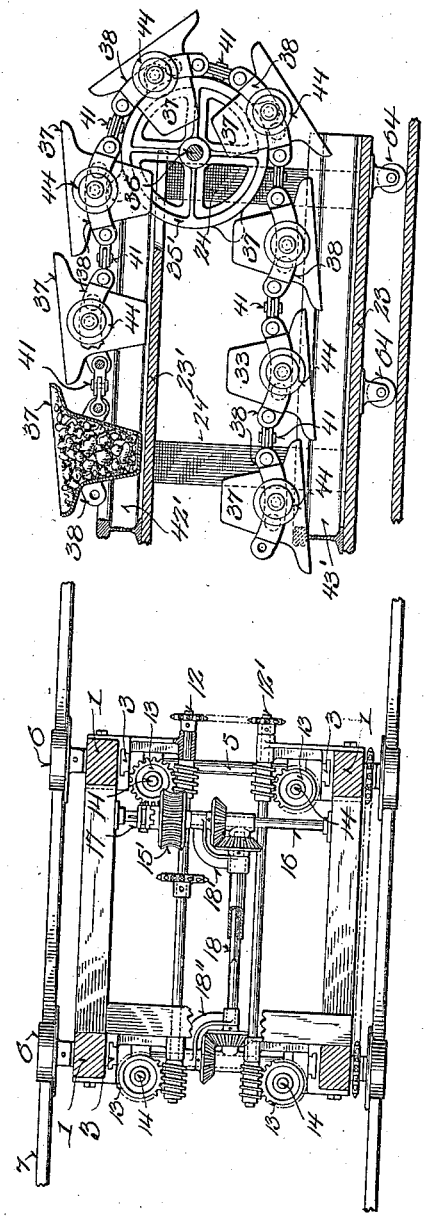

C. BERGHOEFER, DEC'D.
E. C. BERGHOEFER, EXECUTOR.
BOX CAR LOADING APPARATUS.
APPLICATION FILED MAY 5, 1913.
1,090,966.
Patented Mar. 24, 1914.
6 SHEETS—SHEET 5.
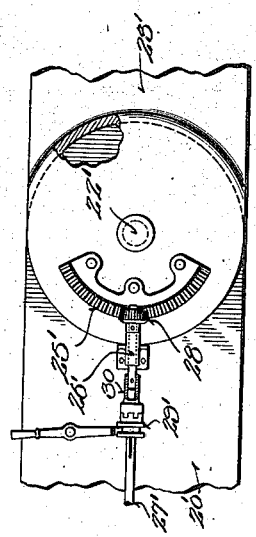
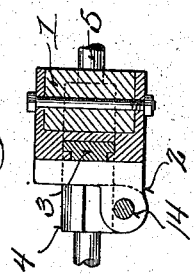
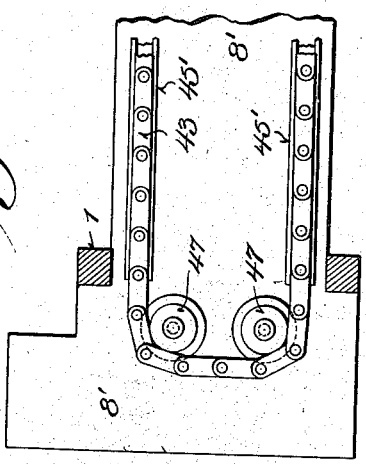
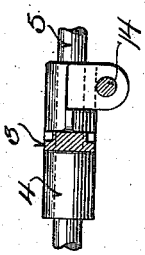

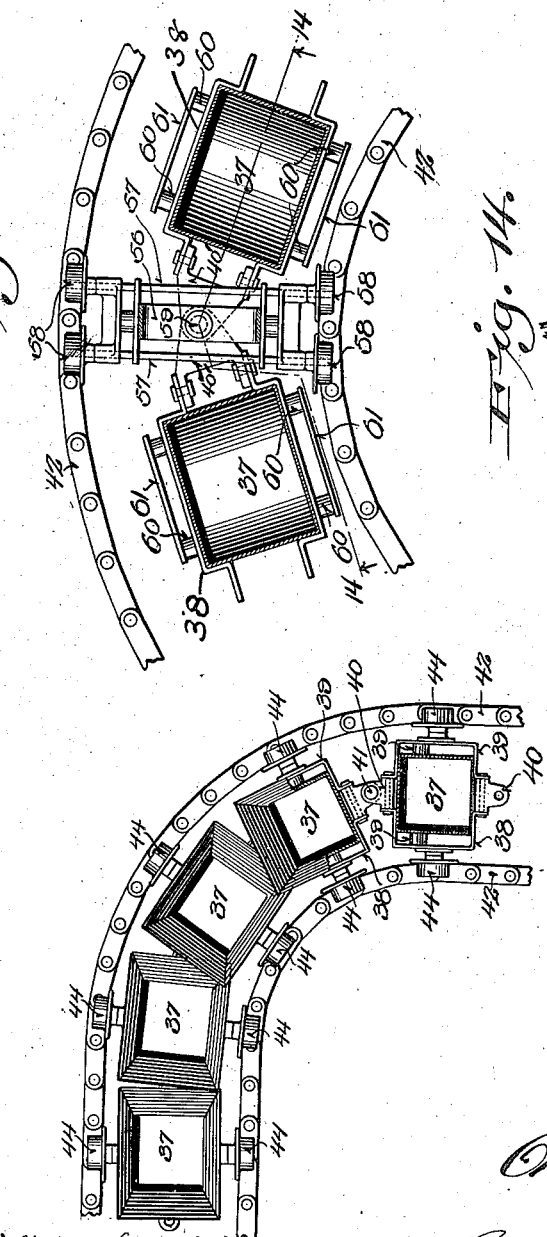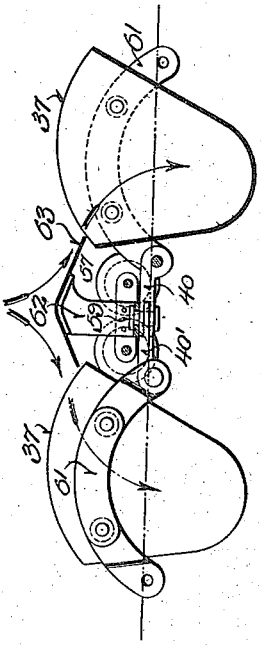

UNITED STATES PATENT OFFICE.

CHARLES BERGHOEFER, OF MILWAUKEE, WISCONSIN; EDWARD C. BERGHOEFER EXECUTOR OF SAID CHARLES BERGHOEFER, DECEASED.

BOX-CAR-LOADING APPARATUS.

1,090,966.  Specification of Letters Patent.  Patented Mar. 24, 1914.

Application filed May 5, 1913. Serial No. 765,558.

*To all whom it may concern:*

Be it known that I, CHARLES BERGHOEFER, a citizen of the United States, and resident of Milwaukee, in the county of Milwaukee and State of Wisconsin, have invented certain new and useful Improvements in Box-Car-Loading Apparatus; and I do hereby declare that the following is a full, clear, and exact description thereof.

The primary object of my invention is to provide a simple, economical and efficient portable box-car loading apparatus, the apparatus being preferably mounted upon a truck-supported platform and comprises a conveyer in the form of an endless bucket-carrying belt that is mounted upon a flexible track, which track is supported by a sectional bridge capable of horizontal swing, whereby the apparatus may be introduced through the door of a standard box-car and adjusted at the will of the operator to selectively deliver the load at the blind ends of the car and intermediate points throughout its length.

The apparatus as a whole is provided with suitable driving gear connections, power being applied thereto from motors mounted upon the platform, all of which gear mechanism is under control of an operator at this point. Thus the conveyer apparatus can be straightened out with relation to the platform, or horizontally shifted from right to left at the will of the operator, while, at the same time, the position of the truck supporting the platform can be shifted upon suitable rails to positions selected longitudinally of the road-bed. It it also apparent that I may provide suitable rails whereby the platform, together with the apparatus, may be caused to travel at a right-angle to the track shown, which track in this instance is arranged parallel to a track upon which the cars to be loaded are switched.

With the above objects in view the invention consists in certain peculiarities of construction and combination of parts as hereinafter set forth with reference to the accompanying drawings and subsequently claimed.

In the drawings Figure 1 represents a plan view of a car-loading apparatus embodying the features of my invention, the same being shown adjusted to the body of a car through its door in such position that the load will be delivered at one end of said car body, a fragment of the car body being shown in section; Fig. 2, a longitudinal vertical section of the loading apparatus, the section being indicated by line 2—2 of Figs. 1 and 3, showing the several hinge-connected bridge members straightened out with parts broken away and positioned to enter the car-body through the door thereof, the conveyer chain and buckets being removed for clearness of illustration; Fig. 3, a cross-section of the apparatus at its platform end, the section being indicated by line 3—3 of Fig. 2; Fig. 4, a cross-section through the swinging bridge elements of the apparatus, the section being indicated by line 4—4 of Fig. 2; Fig. 5, a sectional plan view of the truck-supported platform driving gear, the section being indicated by line 5—5 of Fig. 2; Fig. 6, a detailed sectional elevation of the end members of the bridge showing a portion of the endless chain and the buckets attached thereto, together with the end sheave support for the same; Fig. 7, a detailed sectional plan view of a portion of the platform floor, illustrating the means for supporting a flexible track at the platform end of said apparatus; Fig. 8, an inverted detailed plan sectional view, showing the hinge joint between a pair of the bridge sections, together with the mechanism for swinging the sections; Fig. 9, a detailed plan view of one form of conveyer chain, together with its buckets and a portion of the flexible track for said buckets, the said view illustrating the track flexed into a curve; Figs. 10 and 11, detailed plan sectional views of the platform truck connections, the sections being indicated by lines 10—10 and 11—11 respectively of Fig. 3; Fig. 12, a detailed cross-section of a shiftable roller guide mechanism for the flexible track, the section being indicated by line 12—12 of Fig. 4; Fig. 13, a plan view of my preferred form of combination chain and bucket conveyer, the same being mounted upon sections of the flexible track, which sections are shown flexed in a curve; Fig. 14, an elevation of the same partly in section as indicated by line 14—14 of Fig. 13, and Fig. 15 represents a sectional elevation of an adjustable sheave-shaft box.

Referring by characters to the drawings, 1 represents a superstructure provided with blocks 2, into which blocks are slidably fitted tongues 3 that extend from journal-boxes 4. Mounted in the journal-boxes 4 are truck axles 5 carrying flanged wheels 6, which wheels are supported upon track-rails 7 that are suitably adjusted to a road-bed, the road-bed being in this instance extended at a right-angle to the road-bed of a box-car A. The superstructure 1 carries upper and lower floors 8, 8', respectively, which floors, together with said superstructure constitute a shiftable platform, the shift being accomplished by moving said platform back and forth upon its track-rails 7. Power for accomplishing movement of the platform is obtained from a motor B, which motor, as shown, is bolted to the bottom face of the floor 8'. The motor is in gear connection with a power-shaft 10, which power-shaft, as shown, is provided with a lever-controlled clutch mechanism 11. The loose member of this clutch mechanism is in sprocket-gear connection with a counter-shaft 12, which counter-shaft in turn, is in sprocket-gear connection with a corresponding parallel counter-shaft 12'. Each of these counter-shafts 12 and 12' carry worms which mesh with worm-wheels 13 that are fast upon vertical spindles 14, the same being revolubly mounted within the blocks 2. The lower ends of these spindles are in threaded union with projecting ears 14' that form part of the journal-boxes 4. By this gear connection between the motor when it is desired to raise or lower the platform the clutch mechanism 11 is thrown into operative position, whereby motion is imparted to the spindles 14 through the worm and worm-wheel driving mechanism, whereby the journal-boxes guided in the blocks 2 may be raised or lowered, it being understood that the reverse movement desired for raising and lowering the platform may be effected by reversal of the motor, or, if desired, in some instances, any suitable form of reversing gear may be interposed between the motor and spindles for effecting the same result.

Referring especially to Figs. 2 and 5 the power-shaft 10 carries a worm 15 which meshes with a worm-wheel 15', the same being loosely mounted upon a transverse shaft 16 that is journaled in suitable bearings with which the superstructure is provided. The worm-wheel 15 is adapted to be coupled to the shaft 16 by a lever-controlled clutch mechanism 17, whereby motion may be imparted to the said shaft at the will of the operator. The shaft 16 is also in miter-gear connection with a telescopic shaft 18, which latter shaft is journaled in a bracket 18' that is suspended from the shaft 16. The lower end of the shaft 18 is journaled in a corresponding bracket 18'' that is loosely mounted upon the truck axle 5, the said lower end of the shaft 18 being in miter-gear connection with the axle, as shown. By this gear connection to the motor it is apparent that through manipulation of the clutch mechanism 17 power may be imparted to the truck axle 8, whereby the platform is moved backward or forward, depending upon the direction of rotation of the motor, it being also obvious that this reverse movement can be effected by suitable reversing gear as a substitute for reversal of the motor.

As best shown in Figs. 1 and 2 the forward end of the lower floor 8' is provided with a trunnion 19 upon which is mounted a leaf 20 of a sectional bridge, the said hinged leaf being adapted to swing horizontally upon its trunnion. In axial alinement with the trunnion 19 and supported by the upper table 8 is a corresponding trunnion 19' which serves as a pivot-support for an upper leaf 20' of another sectional bridge series. These two leaves are rigidly connected by suitable struts 21, whereby they move together upon their respective pivots. The outer ends of the bridge leaves 20, 20', carry axially alined trunnions 22, 22', which form pivots for end leaf bridge sections 23, 23', respectively, the same being connected by transverse struts 24. Hence it will be seen that the intermediate and end leaves of the sectional bridge can be swung horizontally within a scope of approximately 190° with relation to the platform by which they are supported. In order to effect swinging of the bridge leaves either selectively or together each of the upper leaves 20', 23', are provided with circular rack-sections 25, 25', which rack-sections are secured to the lower faces of said leaves and are concentric with their respective trunnions. Depending from the upper platform floor 8 are hangers 26 which serve as bearings for one section 27 of a tumbler-shaft, the outer end section 27' of which is mounted in hangers 26' that depend from the bridge leaf 20'. These two tumbler shaft sections are connected by a universal joint 27'' which is axially alined with the bridge leaf trunnions 19, 19'. Hence the outer trunnion shaft section 27' is capable of movement with the swinging bridge sections 20, 20', through its universal coupling. The tumbler-shaft section 27 has loosely mounted thereon a gear-wheel 25'' which meshes with the circular rack 25, while the outer end of the tumbler shaft section 27' carries a similar gear-wheel 28 which meshes with the circular toothed rack 25'. The hub of the gear-wheel 25' is toothed to constitute one member of a clutch mechanism 29, whereby rotation may be imparted to said gear-wheel at the will of the operator. By causing a coupling operation of the clutch mechanism 29 it is apparent that should the tumbler-shaft be rotated, movement will be simultaneously imparted to the table leaf 20' and the table leaf 23' through the gear-wheels 25'' and 28, which gear-wheels mesh with the circular racks 25, 25', of the respective bridge leaf sections.

Hence said sections will be swung horizontally upon their trunnions together with their companion leaf sections 20, 23.

In order to swing the end leaf bridge sections 23, 23′ only, the coupling mechanism 29, in connection with the gear-wheel 25′, is first disconnected and a similar coupling mechansim 29′ is thrown into clutching engagement. One member 30 of this coupling mechanism 29′ is secured to a stud portion of the tumbler-shaft 27′, while the opposite member is in spline connection with the latter tumbler-section. Hence when the coupling operation is effected between the stud section of this portion of the tumbler-shaft the gear-wheel 28, which is secured to said stud section, will be rotated, whereby the swinging end bridge member can be shifted in selective position, in this operation it being understood that the gear-wheel 25′ remains idle. Power is applied to the tumbler-shaft from a motor C which is mounted upon the platform floor 8′, the motor-shaft 31 being in chain and sprocket gear connection with a stud-shaft 31′, which stud-shaft in turn, is in chain and sprocket gear connection with the tumbler-shaft, as best shown in Figs. 2 and 3. Mounted within suitable boxes with which the platform susperstructure is provided is a transverse arbor 32, which arbor carries a toothed double sheave 33. Secured to one end of the arbor is a worm-wheel 34 which meshes with a worm 35 that is fast on the motor-shaft and arranged to impart drive to the arbor.

Referring to Figs. 1 and 6 of the drawings the end struts 24 which connect the bridge leaves 23, 23′, are provided with boxes for the support of an arbor 36, which arbor also carries a toothed double faced idle sheave 33′ that corresponds with the driven sheave 33 carried by the platform, the said sheaves being upon a common horizontal plane. This pair of sheaves serve as supports for an endless chain conveyer carrying a series of buckets 37. Each pair of these buckets have links 38 that are spaced from their side walls to form interstices for engagement of the sheave teeth, the said space between the bucket-walls and links being bridged by a stud 39 which is opposed by the teeth of the driven sheave 33, whereby motion is imparted to the endless conveyer mechanism. The ends of the links 38 are extended from the end walls of the buckets and are apertured for the reception of swivel blocks 40, the ends of which swivel blocks are in pivotal union with the chain links. The juxtaposed pairs of these swivel-blocks are connected by vertically disposed pivot-pins 41, whereby the chain and its buckets are capable of horizontal flexure, it being understood that the horizontally disposed hinge connection between the links and blocks permits flexure of the chain, whereby it is free to travel over its supporting sheaves. The upper and lower stretches of the conveyer intermediate of the sheaves are supported by flexible rails 42, 43, respectively, each of said tracks being provided, for simplicity in construction, with rigid sections 42′, 43′, which sections are secured to the lower and upper end leaf members 23, 23′, of the bridge, as best shown in Figs. 1 and 6. The chain links 38 carry rollers 44, which rollers are arranged to travel upon the upper and lower flexible tracks in order to support both the loaded and empty buckets. The flexible portion of the bucket-supporting tracks is, as shown, composed of a series of connected links and the flexible end portion of the track member 42, adjacent to its platform end, is in the form of an endless loop, straight stretches of the same being guided in grooved runways of brackets 45, which brackets are secured to the upper floor 8 of the platform. From the inner end of these brackets the flexible track is deflected outwardly in opposite directions and guided over idle sheaves 46 that are mounted upon the platform, as best shown in Fig. 1, this deflection of the track being in approximate alinement with the driven conveyer sprocket-wheel 33, whereby the rollers 44 which support the conveyer buckets may run off the track co-incident to the travel of the conveyer about the sheave. The offset portion of the flexible chain which forms the looped end is thereafter guided over large sheaves 46′ which are also carried by the platform, the straight transverse stretch of the flexible chain being so disposed as to permit clearance of the buckets in their upward travel over the sheave 33. As best shown in Fig. 7, the lower flexible track-rail 43 adjacent to its platform end is simply looped over a pair of guide-sheaves 47 that are mounted upon the lower floor 8′ of the platform, the said parallel stretches of this rail form, being guided in grooves of brackets 45′ which extend from the adjacent platform flooring and are similar to the brackets 45. The portions of the upper and lower flexible rails 42, 43, which are designed to be flexed in a curve, in order to conform to the various positions of the bridge leaves, are primarily supported by the intermediate bridge leaves 20, 20′, and in order to insure the support of the tracks upon their curved portions connecting the end bridge leaf and platform, I provide upper and lower floating tables 48, 48′. One end of the lower table 48′ is pivoted upon the trunnion 19 and the corresponding end of the upper table 48 is pivoted upon the trunnion 19′, the outer free ends of these tables being adapted to swing in order to conform to the position assumed by the flexible rail members. The said free ends of each of these tables are supported by rollers 49 which travel upon transversely disposed circular track sections 50 that are carried by the bridge-leaves 20, 20', as best shown in Figs. 2 and 4 of the drawings. Each of the tables are provided with sets of transversely disposed grooves 51, into which are slidably fitted shoes 52, which shoes carry upwardly projecting guide-rollers 53, between which guide-rollers the flexible stretches of the chain are adapted to travel, the said tables being also provided with sets of non-shiftable guide-rollers 54 for positioning the track sections, the same being disposed at the opposite ends of the series of shiftable guide-rollers 53. The flexible sections are further guided between sets of rollers 54' which are supported by chairs 55 that extend from the upper and lower bridge leaf members 23, 23', the said chairs forming terminals of the rigid portions 42, 42' of the conveyer supporting rails.

Figs. 13 and 14 illustrate my preferred form of conveyer, in which form I provide a truck between each pair of buckets 37'. Each of the trucks comprises a suitable skeleton frame 56 that is provided with boxes for parallel axles 57, each of which carries a set of flanged wheels 58 that are arranged to travel upon the flexible track. The sides of the buckets are provided with the links 38 which are similar in construction to those previously described in connection with the other form of conveyer. These links in turn have pivoted to their ends swivel-blocks 40', a corresponding pair of which swivel-blocks are hinged to the truck-frame 56 by a king-bolt 59. Secured to spacing thimbles 60 which project from the links 38 are straps 61, the spacing thimbles and straps forming pockets for engagement with the conveyer sheaves 33, 33'. In this instance the truck-frame 56 is provided with upwardly extending feet 62, which feet serve as supports for a deflector hood 63, the edges of the same being extended over the juxtaposed edges of adjacent buckets, whereby the material discharged upon the conveyer is deflected into said buckets, the hood serving also as a support for superfluous material. Thus the capacity of the conveyer may be increased, while at the same time it is capable of flexure both in a horizontal and vertical direction to compensate for movement of the bridge.

As shown in Figs. 1 and 2, when it is desired to load a box-car the bridge of the apparatus is first straightened out by proper manipulation of the mechanism and the end section introduced through the car-door. Thereafter the bridge is moved toward the car-door by its drive mechanism and the sectional tumbler rod 27' is also put into motion, whereby the leaf members are turned in the desired direction to be introduced through the car-door, the same assuming a longitudinal position with relation to the car body as the bridge travels forward, in which position the end leaf member is disposed at a right-angle to the bridge. The floating table will automatically assume the position shown in Fig. 1, whereby the curvature of the track members is permitted, while at the same time shortening of the inner track through its curvature will be compensated for by movement of the chain about the sheaves at its loop end in order that the desired length of the outer curvature of said track can be obtained. Thereafter motion is imparted to the conveyer mechanism, whereby the buckets will be caused to travel inwardly, their working stretch being supported upon the upper flexible track section 42. Coal or other product to be loaded into the car is discharged from a suitable hopper as indicated by dotted lines in Fig. 2, the material discharged being delivered successively to the buckets as they travel over the driven sheave 33. It follows that the contents of the buckets is discharged as the latter travel downwardly over the idle sheave 33' which is carried by the end member of the sectional bridge and the empty buckets are returned to their starting position, the idle stretch of buckets being guided over the lower flexible track 43. As the blind end of the car is filled to the desired height with coal or other material the apparatus is gradually withdrawn and when one end of the car is filled to its door the swinging bridge is reversed, whereby it is introduced into the opposite end of said car and the loading operation repeated. It is also apparent that while I have shown the end bridge leaf of considerable length in proportion to the intermediate leaf, that, in practice, this section may be materially shortened to facilitate manipulation and furthermore the number of leaves may be increased or diminished in designing the apparatus to meet its various requirements. It is also manifest that while I have shown one form of complete driving gear for the various parts and means for controlling the same by coupling mechanisms that the driving mechanism and minor structural features may all be varied within the knowledge of skilled mechanics without departing from the spirit of my invention, as, for example, in some instances, it has been found in practice that variable speed gearing connections to the motors may be introduced, whereby the movements may be imparted to the various elements at different speed ratios. In order to compensate for the weight at the swinging end of the bridge, as shown in Fig. 2, the lower leaf member of said bridge may be provided with supporting rollers 64, which rollers are adapted to travel upon the floor of the car and thus relieve the platform from undue strain, it being apparent that by vertically adjusting the platform through the spindles 14 that these rollers can be so regulated with relation to the plane of the floor as to be effective.

As best shown in Fig. 1, in order to support the flexible chain-stretches 42, 43, at the gap between the floating tables 48 and 48', I provide a pair of fixed flanged rollers 66, which rollers are adapted to engage the inner surface of the outer chain-stretches when the end bridge-leaf is swung in its extreme positions. Thus the curvature of the chains is positively maintained, while at the same time they are supported by the roller flanges thereunder. In practice in some instances it is desired to raise the conveyer mechanism at its discharge end in order to increase the height of the point of discharge to effect desirable loading, whereby the coal or other article can be piled at a sufficient height under the mechanism. In order to accomplish this result, as shown in Fig. 15, the shaft which carries the double sheave 35' is mounted upon boxes 67 which are in slidable engagement with plates 68, the plates being secured to the struts 24. These plates carry adjusting screws 69 which are in threaded union with the boxes, whereby the conveyer chain and sheaves may be raised at the discharge end after the apparatus has been adjusted to deliver the load at the ends of the car. Thus the point of discharge may be materially elevated whereby the buckets will clear the discharged product which may be thus piled to a considerable depth.

I claim:

1. A loading apparatus comprising a main platform, a horizontally swinging bridge carried thereby, a flexible track mounted upon the bridge, and an endless conveyer supported upon the flexible track.

2. A loading apparatus comprising a truck-supported platform, a horizontally swinging sectional bridge carried thereby, a flexible track mounted upon the bridge and platform, and an endless bucket-carrying conveyer supported upon the flexible track.

3. A loading apparatus comprising a platform, a sectional horizontally swinging bridge carried thereby, a flexible track mounted upon the bridge and platform, a flexible endless bucket-carrying conveyer supported upon the flexible track, and means for shifting the position of the bridge with relation to the platform.

4. A loading apparatus comprising a platform, a sectional horizontally swinging bridge carried thereby, a flexible track mounted upon the bridge and platform, a flexible endless bucket-carrying conveyer supported upon the flexible track, and means for selectively shifting the position of the bridge sections.

5. A loading apparatus comprising a truck-supported platform, a series of bridge leaves in hinge connection with each other and the platform, the bridge leaves being adapted to swing in a horizontal plane, a drive-shaft mounted upon the platform, an idle sheave mounted upon the end leaf of the bridge, an endless flexible conveyer carried by the sheaves, a horizontally flexible track mounted upon the bridge-leaves and platform for the support of the conveyer stretches, and mechanism for shifting the position of the aforesaid series of bridge leaves relative to said platform.

6. A loading apparatus comprising a platform, upper and lower series of bridge-leaves in hinge connection with each other and the platform, the corresponding upper and lower bridge leaves being secured together, a sheave mounted upon the platform and a sheave mounted upon the end section of the bridge between its leaves, an endless bucket-carrying conveyer mounted upon the sheaves, upper and lower flexible track members carried by the bridge sections and platform for the support of the working and idle stretch of the conveyer, and mechanism for shifting the position of the aforesaid series of bridge sections relative to the platform.

7. A loading apparatus comprising a shiftable platform, upper and lower corresponding series of spaced bridge leaves, the corresponding upper and lower leaves of each bridge-leaf section being in hinge connection with each other and having the pintles of both series in axial alinement, means connecting the corresponding upper and lower bridge leaves of each section, a pivoted connection between the first bridge section and platform, a drive sheave mounted upon the platform between the leaves of the first bridge section, an idle sheave mounted between the upper and lower leaves of the last bridge section, an endless link belt mounted upon the sheaves, buckets carried by the belt, a vertically disposed hinge connection between the buckets whereby horizontal flexure of the same is had, flexible supporting tracks for the buckets carried by the upper and lower leaves of the various bridge sections and platform, and mechanism for shifting the connected upper and lower leaves of the various bridge sections.

8. A loading apparatus comprising a platform, a supporting truck therefor, means for adjusting the platform vertically with relation to the truck, means for shifting the position of the truck with relation to its road-bed, a horizontally swinging sectional bridge carried by the platform, a flexible track mounted upon the platform and bridge, and an endless bucket-carrying conveyer supported upon the flexible track.

9. A loading apparatus comprising a platform, a leaf-member in hinge connection therewith, other leaf members in hinge connection with each other and the first mentioned leaf member, a gear connection between the leaf members whereby their position is varied with relation to the platform, a flexible track mounted upon the various bridge leaves and platform, means for horizontally guiding the flexible track incidental to its curvature in following movements of the various bridge leaves, and an endless bucket-carrying conveyer supported upon the track.

10. A loading apparatus comprising a platform, upper and lower connected bridge leaf members pivoted thereto, upper and lower connected end bridge leaf members pivoted to the first mentioned bridge leaf members, rigid tracks carried by the end leaf members, flexible looped track sections supported upon the other leaf members and platform constituting continuations of the rigid track members, means for swinging the connected leaf members selectively or in series, and an endless bucket-carrying conveyer supported upon the platform and end leaf bridge members, the stretches of the conveyer being supported by the flexible and rigid track sections.

In testimony that I claim the foregoing I have hereunto set my hand at Milwaukee in the county of Milwaukee and State of Wisconsin in the presence of two witnesses.

CHARLES BERGHOEFER.

Witnesses:
  Mrs. W. KALITZKY,
  J. M. ETTENHEIM.